United States Patent [19]
Orkin et al.

[11] Patent Number: 6,090,869
[45] Date of Patent: Jul. 18, 2000

[54] SELF-LUBRICATING COATING COMPOSITION OF EPOXY RESINS, POLYTETRAFLUOROETHYLENE, MOS$_2$ AND MICA

[75] Inventors: Stanley S. Orkin, Vernon; Nikolay Nazaryan, West Hartford; Glen Greenberg, Avon, all of Conn.

[73] Assignee: Turbine Controls, Inc., Bloomfield, Conn.

[21] Appl. No.: 09/183,859

[22] Filed: Oct. 30, 1998

[51] Int. Cl.$^7$ .......................... C08K 03/10; C08L 63/00; C08L 63/02; B32B 15/08
[52] U.S. Cl. .......................... 523/433; 523/457; 523/458; 428/418; 508/107; 508/108
[58] Field of Search .................................... 523/433, 458, 523/457; 508/107, 108; 428/418

[56] References Cited

U.S. PATENT DOCUMENTS

| | | | |
|---|---|---|---|
| Re. 29,092 | 12/1976 | Schiefer et al. | 252/12.4 |
| 4,996,085 | 2/1991 | Sievers | 427/140 |
| 5,171,622 | 12/1992 | Wegner | 428/143 |
| 5,219,956 | 6/1993 | Fukuoka | 525/526 |
| 5,316,790 | 5/1994 | Chan et al. | 427/142 |
| 5,344,515 | 9/1994 | Chenock, Jr. | 156/171 |
| 5,427,698 | 6/1995 | Hirokawa et al. | 252/12.4 |

FOREIGN PATENT DOCUMENTS

| | | |
|---|---|---|
| 5-43867 | 2/1993 | Japan . |
| 6-16968 | 1/1994 | Japan . |
| 10-43677 | 2/1998 | Japan . |

OTHER PUBLICATIONS

Franklin Industrial Minerals Typical Property Data Sheet L–135 for Dry Flake Muscovite Mica, Oct. 1997.
Franklin Industrial Minerals Typical Property Data Sheet–H360 for Wet Ground Muscovite Mica, Oct. 1997.
Franklin Industrial Minerals Material Safety Data Sheet for Various Wet Ground Mica and Dry Ground Mica, Sep. 1997.
DuPont Products Information Sheet ZONYL® MP1000 fluoropolymer resin (fluoroadditive), 1997.
Dow Corning Product Information Sheet Z Moly–Powder molybdenum disulfide, 1996.
DuPont Technical Information Bulletin TF–7 for TEFLON® PTFE, fluorocarbon fiber, Apr. 1993.
Ciba Speciality Chemicals Product Data Sheet for ARALDITE® RD–2 Di–Epoxide Reactive Diluent, Oct. 1997.
Ciba Speciality Chemicals Material Safety Data Sheet for ARALDITE® RD–2 Epoxy Resin Reactive Diluent, Oct. 1997.
Dexter Electronic Materials Division Technical Information Bulletin for Hysol SR1000, SR1010, 1997.
Dexter Electronics Materials Division Material Safety Data Sheet for Hysol SR1000, Jul. 1994.
Dexter Aerospace Materials Division Product Bulletin for Hysol EA 929NA, 1997.
Dexter Aerospace Material Safety Data Sheet for Hysol EA 929NA, Sep. 1994.
Hu and Zu, "The friction and wear characteristics of polymer anti–friction coating and their application to the machine tool industry in China," Proceedings of the Institute of Mechanical Engineering, IMechE Conference, vol. 2, 1987, pp. 747–751.

*Primary Examiner*—Robert E. Sellers
*Attorney, Agent, or Firm*—William A. Simons; Wiggin & Dana

[57] ABSTRACT

A self-lubricating coating composition that is a curable admixture of two specific epoxy resin compositions; a di-epoxide reactive diluent; polytetrafluoroethylene; molybdenum disulfide, and mica. This composition, when cured, may be incorporated onto the undamaged surfaces or into damaged or worn areas of a substrate (e.g., aircraft fuel and oil pump housings).

7 Claims, No Drawings

SELF-LUBRICATING COATING COMPOSITION OF EPOXY RESINS, POLYTETRAFLUOROETHYLENE, MOS₂ AND MICA

BACKGROUND OF THE INVENTION

1. Field of the Invention

The present invention relates to a self-lubricating coating composition that comprises an admixture of two specific epoxy resin compositions; a di-epoxide reactive diluent; polytetrafluoroethylene; molybdenum disulfide and mica Moreover, the present invention is directed to a substrate that has the cured form of the above admixture that is either incorporated onto a undamaged surface of the substrate or into damaged or worn areas of the substrate.

2. Brief Description of the Art

Self-lubricating coatings are used for a wide variety of industrial applications, offering a movable linkage connection without the need for lubrication by grease and/or oil. Self-lubricating coating compositions provide a high load capability with lower friction than exhibited by metal/metal bearings contact as well as having a relatively long life without the need for replenishing the lubrication media. In particular, self-lubricating coatings have proven useful in aircraft and bearing industrial equipment, where severe operating conditions can occur. For example, aircraft fuel and oil pump housings require repair because their gear drive bushings wear away during use. This wear (called "galling" or "scoring" or "gear wiping") limits the longevity of the pump housing and requires their replacement or their rebuilding.

One method of rebuilding such pump housing is disclosed in U.S. Pat. No. 4,996,085 which issued to Sievers on Feb. 26, 1991. That patent teaches coating the pump housing surfaces to be treated with a composition comprising a hardenable epoxy resin, a reinforcing filler, and an agent having a lower coefficient of friction than the epoxy resin. It is noted col. 2, lines 44–45, suggest that graphite may function as the reinforcing filler. Col. 3, lines 43–54, of the reference also teaches the frictional reducing agent may be either graphite, in fibrous or granulated form; fluorinated carbon (i.e., —(CF$_x$)— wherein x<2); or molybdenum disulfide. It is noted that this reference does not provide any further specifics as to the fluorinated carbon materials useful for that invention. It is also noted that the preferred class of epoxy resins in this reference are diglycidyl ether of a dihydric phenol (e.g., the diglycidyl ether of bisphenol A).

A second method of treating such worn pump housing surfaces is disclosed in U.S. Pat. No. 5,316,790 which issued to Chan et al. on May 31, 1994. This patent describes a lubricative coating and filler material for restoring metal surfaces that have scratched, scored, grooved, or otherwise damaged to a functional condition. This coating and filler material is a mixture of an epoxy resin, tungsten disulfide, and isopropyl alcohol in a ratio of 9:1:1.6.

While these coating materials may be satisfactory for certain applications, there is still need for a better self-lubricating coating compositions useful for a wide variety of applications including pump housing materials or pump housing repair compositions.

BRIEF SUMMARY OF THE INVENTION

Accordingly, one aspect of the present invention is directed to a curable composition useful as a self-lubricating coating and comprising an admixture of:

(1) a first one-component epoxy resin composition, wherein said first one-component epoxy resin composition is about 40% to about 60% by weight of the admixture and is comprised of:
  (a) about 10–30% by weight of 4-gylcidyloxy, N,N-diglycidyl aniline;
  (b) about 30–60% by weight of an epoxy resin, wherein said epoxy resin is the diglycidyl ether of bisphenol A; and
  (c) about 3–7% by weight of strontium chromate;
(2) a second one-component epoxy resin composition, wherein said second one-component epoxy resin composition is about 5% to about 20% by weight of the admixture and is comprised of:
  (a) about 50% to about 90% by weight of an epoxy resin, wherein said epoxy resin is a diglycidyl ether of bisphenol A;
  (b) about 5% to about 25% by weight of diethylene glycol monoethyl ether acetate; and
  (c) about 5% to about 25% by weight of p-tert-butylphenyl glycidyl ether;
(3) di-epoxide reactive diluent; wherein the di-epoxide reactive diluent is about 2% to about 30% of the admixture;
(4) polytetrafluoroethylene, wherein the polytetrafluoroethylene is about 2% to about 20% by weight of the admixture;
(5) molybdenum disulfide, wherein the molybdenum disulfide is about 2% to about 20% by weight of the admixture; and
(6) mica; wherein the mica is about 0.5% to about 13% by weight of the admixture;

A second aspect of the present invention is directed to a substrate having the above-noted curable composition incorporated therein.

DETAILED DESCRIPTION OF THE PREFERRED EMBODIMENTS

The preferred self-lubricating composition of the present invention comprises: (1) about 40% to about 60% by weight of HYSOL EA 929NA epoxy resin composition; (2) about 5% to about 20% by weight HYSOL SR1000 high solids epoxy resin/solvent mixture; (3) about 2% to about 30% by weight of ARALDITE RD-2 di-epoxide reactive diluent; (4) about 2% to about 20% of ZONYL MP1000 polytetrafluoroethylene powder; (5) about 2% to about 20% by weight Z Moly-Powder molybdenum disulfide powder; and (6) and about 0.5% to about 13% H360 wet ground mica.

HYSOL EA929NA epoxy resin is available from the Dexter Aerospace Materials Division of Hysol Aerospace Products of Pittsburg, Calif. This product contains 4-glycidoxy, N,N-diglycidyl aniline. [Chemical Abstract No. 5026-74-4], a bisphenol A epichlorohydrin polymer (a diglycidyl ether of bisphenol A) [Chemical Abstract No. 25068-38-6], strontium chromate [Chemical Abstract No. 7789-06-2] and optionally amorphous silica [Chemical Abstract no. 112945-52-5]. This epoxy resin composition is a one component epoxy resin. The term one-component as used herein means the epoxy resin is pre-catalyzed. The 4-glycidyloxy, N,N-diglycidyl aniline constitutes about 10 to 30% by weight of this epoxy resin composition, the bisphenol A epichlorohydrin polymer constitutes about 30 to 60% by weight of this epoxy resin composition; the strontium chromate constitutes about 3 to 7% by weight of this epoxy resin composition and the amorphous silica optionally constitutes 0 to about 5% by weight of this epoxy resin composition.

HYSOL SR1000 is available from the Dexter Electronic Materials Division of the Dexter Corporation of Industry, Calif. This product contains diethylene glycol monoethyl ether acetate solvent (also known as carbitol acetate) [Chemical Abstract No. 000112152] as a solvent, as well as a bisphenol A epichlorohydrin polymer (a diglycidyl ether of bisphenol A) [Chemical Abstract No. 025068-38-6] as an epoxy resin, and p-tert-butylphenyl glycidyl ether [Chemical Abstract No. 068958225] as a reactive diluent. The epoxy resin portion of this product constitutes a major portion (i.e., greater than 50% by weight) of this product. More specifically, the HYSOL SR1000 contains about 1–15% by weight diethylene glycol monoethyl ether acetate; more than 70% by weight of the bisphenol A epichlorohydrin polymer and about 1–15% by weight of p-tert-butylphenyl glycidyl ether. The epoxy resin used in this product is an one-component coatable-type epoxy resin. The term one-component as used herein means that the epoxy resin is pre-catalyzed and the term coating-type means a type other than adhesive-type epoxy resins. Small amounts of solvent will flash off during the curing process, causing little chance for voids in the rebuilt pump housing surface.

This combination of these two epoxy resin compositions results in excellent bonding capabilities of the self-lubricating composition to the underlying substrate as well as of the various components of this self-lubricating composition.

The preferred di-epoxide reactive diluent is ARALDITE RD-2 which is available from Ciba Specialty Chemicals of Brewster, N.Y. This di-epoxide reactive diluent is 1,4-butanediol digylcidyl ether and is added to lower the viscosity of the composition and improve its handling characteristic. It is believed that the reactive diluent results in a suitable surface tension between the surfaces of the filler particulates and the above-noted two epoxy resins. This desired surface tension in turn is believed to provide better bonding characteristics and minimal porosity in the coating (when cured) on the substrate.

Three different types of particulate fillers are used in the present invention. These are polytetrafluoroethylene, molybdenum disulfide and mica.

The preferred form of polytetrafluoroethylene is polytetrafluoroethylene powder, also known as TEFLON powder which is a fluorinated carbon polymer of the formula —$(CF_x)$— where x=2. The preferred polytetrafluoroethylene powder is ZONYL MP1000, polytetrafluoroethylene powder available from DuPont Fluoroproducts of Wilmington, Del. Alternatively, other polytetrafluoroethylene powders or polytetrafluoroethylene flocks may be used.

The preferred molybdenum disulfide is Dow Corning Z Moly-Powder molybdenum disulfide powder available from Dow Corning Corporation of Midland, Mich.

The preferred mica is H360 wet ground muscovite mica available from Franklin Industrial Minerals of Kings Mountain, N.C. Alternatively, L-135 dry flake muscovite mica from the same company may be also used.

The typical particulate sizes of these fillers are 0.3 to 20 microns for the ZONYL MP1000 polytetrafluoroethylene powder; 1.2 to 62 microns for the Z Moly-Powder molybdenum disulfide powder; and 0.1 to 39 microns for the H360 mica powder.

More preferably, the composition comprises about 45–55% by weight of the EA929NA epoxy resin composition, about 10–15% by weight of SR1000 epoxy resin composition; about 15–25% by weight of the RD-2 reactive diluent; about 4–8% by weight of the polytetrafluoroethylene powder; about 6–12% by weight of molybdenum disulfide powder, and about 1–5% by weight of the H-360 mica powder, all percentages based on total weight of the admixture. Other fillers such as graphite powder or fiberglass fibers may be optionally added in amounts from 0 to about 5% by weight of the admixture.

The curable composition may also optionally contain color additives, metal powders or both. If it is desirable to use a metal powder, then silver powder, copper powder or aluminum powder as well as tungsten selenide, tantalum sulfide, molybdenum diselenide and boron nitride in amounts from about 0.5% to 20% of the curable composition may be used to achieve different lubrication and wear reducing characteristics for specific applications.

The above mentioned six critical materials, as well as the optional ingredients, are preferably mixed together at ambient temperature to form a liquid slurry. Air may be removed from the slurry by having the mixing occur under a vacuum. The self-lubricating composition slurry may be applied to a variety of substrates. The composition may be applied by brush, spray, low pressure transfer or other suitable application methods. Any suitable backing material may be used as a substrate. The substrate may include stainless steel, titanium alloys, aluminum alloys, carbon steel as well as magnesium and brass alloys. Also, non-metallic substrates such as plastics may be used. One preferred substrate is the damaged or undamaged surfaces or a stainless steel aircraft fuel and oil pump housings.

Besides its preferred use on pump housings, the curable composition of the present invention may also be used to coat new parts or repair housing parts on pistons, gear boxes, cover assemblies, valve bodies, actuators, cylinders, shafts, bearings, impellers and journals.

In order to ensure sufficient bondability and repeatability of the desired products of the coated substrate, metal substrate surfaces to be coated may be preferably roughened by grit blasting with a media sufficient to produce surface roughness of 250 RMS without exaggerating the peaks and valleys of the undamaged or damaged surface. If grit blasting is employed, the surface is also preferably scrubbed before coating with the composition of the present invention to remove any embedded grit media. The roughened surface may also be preferably subjected to a chemical cleaning before the coating operation.

After being applied, the slurry is cured by heating the slurry and the substrate to which it is applied to suitable curing temperature for a sufficient amount of time. Preferably, curing temperatures are from about 100 to about 175° C. The cured composition may then be machined to form a smooth surface on the pump or other substrate structure. When applied to the damaged surfaces, the cured composition acts as a filling and coating to the surface of the pump housing. When applied to the undamaged surfaces, it acts as a coating to prevent future wear.

The self-lubricating compositions of the present invention offer several significant commercial advantages,. They are low cost to make. They are useful for a wide diversity of applications. They can be applied by simple procedures. They are compatible with a wide variety of substrate materials and substrate configurations and they have the ability to be machined by either conventional single point tooling, grinding, honing or polishing operations. Furthermore, the viscosity of the compositions of the present invention can easily be adjusted by varying the amounts of the individual components and, thus, substrates such pump housings requiring repair can be easily filled to various depths with these compositions without pre-machining. Still further, these compositions do not require bonding pressures to ensure excellent adhesion to substrates and high load capability. Also, this polymer matrix contains random orientation of non-connecting fillers which aids in resisting corrosion and wear.

Since these curable compositions of present invention are in slurry state before being cured, they can be readily applied onto any surface, including inner diameters, and spherical surfaces. For simple shapes, these compositions can be molded into a solid form on a substrate or machined from a solid bar on a substrate into the desired final configuration. For larger surfaces, these compositions may be sprayed onto a substrate and then cured.

The following Examples are provided to better illustrate the present invention. All parts and percentages are by weight and all temperatures are degrees Celsius, unless explicitly stated otherwise.

EXAMPLE 1

Preparation of Self-Lubricating Composition

In a plastic container, a mixture of 50 parts by weight of the HYSOL EA929NA epoxy resin composition; 12 parts by weight of the SR1000 epoxy resin; 20 parts by weight of the RD-2 reactive diluent; 9 parts by weight of the Z Moly-Powder molybdenum disulfide; 6 parts by weight of the ZONYL MP1000 polytetrafluoroethylene powder and 3 parts by weight of the H360 mica powder was thoroughly mixed together by hand for 10 to 15 minutes.

The resulting slurry was then evaluated by the following tests:

EXAMPLE 2

Wear Testing

An aluminum bushing having an outside diameter of 1.250 inches and a base inside diameter of 1.021 inches and a width of approximately 0.550 inches was coated on the inside diameter with the curable coating of Example 1 which was then cured to form a cured coating having a thickness of about 0.010 to about 0.008 inches. A solid rotatable spindle made from stainless steel 17-4PH900 having the dimensions of a 0.999 inches diameter and 7 inches length was inserted through the inner diameter of the bushing. The combined bushing and spindle were placed in a rotating testing apparatus whereby the bushing could be held stationary while the spindle could rotate inside the bushing. The spindle surface had a degree of roughness of 8 to 12 RMS.

The rotating testing apparatus was turned on at a speed of 200 RPM. This is equivalent to a velocity of 52.3 feet per minute.

The pressure generated at the interface of the bushing ID coating and the rotating spindle was calculated to be 1857 psi. The pressure velocity (PV) was in turn calculated to be 98,125 psi feet per minute.

The weight of the coated bushing before testing was 10.3322 grams.

The spindle was rotated for 60 minutes at 200 rpm for a total of 12,000 revolutions. During this test, the temperature of bushing raised from 64° F. to 250° F.

The weight of the coated bushing after this was 10.3319 grams. The wear of the coated bushing was found to be about 0.3 milligrams. This value indicates that the coated bushing possessed good wear resistance.

EXAMPLE 3

Repeated Wear Test

Another coated bushing and spindle of the same dimensions were tested according to the same procedures as stated in Example 2. During testing, the temperature of bushing raised from 79° F. to 240° F. The weight of the coated bushing before testing was 10.4270 grams and after testing was 10.4267 grams, indicating wear of about 0.3 milligrams. This wear value shows that this coated bushing also possesses good wear resistance.

EXAMPLE 4

Hardness Test

A Rockwell 15X Superficial Hardness Test was carried out on a cured coating composition of Example 1. The curable composition of Example 1 was applied to a 0.25 inch thick aluminum disk and then heat cured. The thickness of cured coating was 0.01 inch. Three measurements of hardness were taken. These were 96.0, 96.0 and 97.0, averaging as 96.3.

This average hardness value indicates the tested cured coating possessed excellent hardness.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A curable composition useful as a self-lubricating coating and comprising an admixture of:
   (1) a first one-component epoxy resin composition wherein said first one-component epoxy resin composition is about 40% to about 60% of the admixture and is comprised of:
       (a) about 10–30% by weight of 4-glycidoxy, N,N-diglycidyl aniline;
       (b) about 30–60% by weight of an epoxy resin, wherein said epoxy resin is epichlorohydrin ether of bisphenol A; and
       (c) about 3–7% by weight of strontium chromate;
   (2) a second one-component epoxy resin composition, wherein said second one-component epoxy resin composition is about 5% to about 20% by weight of the admixture and is comprised of:
       (a) about 50% to about 90% by weight of an epoxy resin, wherein said epoxy resin is a diglycidyl ether of bisphenol A;
       (b) about 5% to about 25% by weight of diethylene glycol monoethyl ether acetate; and
       (c) about 5% to about 25% by weight of p-tert-butylphenyl glycidyl ether;
   (3) di-epoxide reactive diluent; wherein the di-epoxide reactive diluent is about 2% to about 30% of the admixture;
   (4) polytetrafluoroethylene, wherein the polyfluoroethylene is about 2% to about 20% by weight of the admixture;
   (5) molybdenum disulfide, wherein the molybdenum disulfide is about 2% to about 20% by weight of the admixture; and (6) mica; wherein the mica is about 0.5% to about 13% by weight of the admixture.

2. The composition of claim 1 wherein said di-epoxide reactive diluent (3) is 1,4-butanediol diglycidyl ether.

3. The composition of claim 1 wherein said admixture comprises about 45 to 55% by weight of said first epoxy resin composition; about 10 to 15% by weight of said second epoxy resin composition; about 15 to 25% by weight of said di-epoxide reactive diluent; about 4 to 8% of polytetrafluoroethylene; about 6 to 12% of molybdenum disulfide; and about 1 to 5% by weight mica.

4. The composition of claim 1 wherein the polytetrafluoroethylene is in powder form..

5. The composition of claim 1 wherein the molybdenum disulfide is in powder form.

6. A coated substrate having incorporated therein a cured form of the composition of claim 1.

7. The coated substrate of claim 6 wherein said substrate is an aircraft pump housing structure having a repaired worn surface containing said cured composition.

* * * * *